(12) United States Patent
Gingrich et al.

(10) Patent No.: US 8,996,281 B2
(45) Date of Patent: Mar. 31, 2015

(54) CATALYST LIGHT-OFF FOR TURBOCHARGED INTERNAL COMBUSTION ENGINE HAVING DEDICATED EGR CYLINDER(S)

(71) Applicants: Jess W. Gingrich, San Antonio, TX (US); Terrence F. Alger, II, San Antonio, TX (US)

(72) Inventors: Jess W. Gingrich, San Antonio, TX (US); Terrence F. Alger, II, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 266 days.

(21) Appl. No.: 13/680,016

(22) Filed: Nov. 17, 2012

(65) Prior Publication Data
US 2014/0142833 A1 May 22, 2014

(51) Int. Cl.
*F02M 25/07* (2006.01)
*F02D 41/02* (2006.01)
*F02M 25/00* (2006.01)
*F02D 41/00* (2006.01)

(52) U.S. Cl.
CPC ............ *F02M 25/0749* (2013.01); *F02D 41/00* (2013.01); *F02D 41/0255* (2013.01); *F02D 41/0055* (2013.01); *F02M 25/0707* (2013.01); *F02M 25/0751* (2013.01); *F02M 25/0755* (2013.01); *Y02T 10/26* (2013.01); *Y02T 10/47* (2013.01)

USPC ...................................... 701/108; 123/568.17

(58) Field of Classification Search
CPC ....................... F02M 25/0707; F02M 25/0749
USPC ............... 701/103, 108; 123/568.11, 568.17, 123/568.15, 568.21, 698, 58.8; 60/273
See application file for complete search history.

(56) References Cited

U.S. PATENT DOCUMENTS

| | | | |
|---|---|---|---|
| 6,637,204 B2 * | 10/2003 | Ellmer et al. | 60/606 |
| 8,291,891 B2 | 10/2012 | Alger et al. | |
| 2009/0308070 A1 * | 12/2009 | Alger et al. | 60/602 |
| 2011/0000470 A1 * | 1/2011 | Roth | 123/568.11 |
| 2012/0036847 A1 | 2/2012 | Schreiber et al. | |
| 2012/0204844 A1 | 8/2012 | Gingrich et al. | |
| 2012/0204845 A1 | 8/2012 | Gingrich et al. | |

FOREIGN PATENT DOCUMENTS

FR 2879668 A1 * 6/2006

* cited by examiner

*Primary Examiner* — Mahmoud Gimie
(74) *Attorney, Agent, or Firm* — Chowdhury & Georgakis PC; Ann C. Livingston

(57) ABSTRACT

A method of decreasing the light-off time of a catalytic exhaust aftertreatment device, using exhaust gas recirculation (EGR) in a turbocharged internal combustion engine. The engine has at least one "dedicated EGR cylinder", whose entire exhaust is recirculated back to all the engine cylinders. The dedicated EGR cylinder(s) may be operated to produce a differently compositioned exhaust gas than the other cylinders. During light-off, EGR gas is optimized for heat, diverted from the EGR loop and routed to a point directly upstream the aftertreatment device.

18 Claims, 2 Drawing Sheets

CATALYST LIGHT-OFF FOR TURBOCHARGED INTERNAL COMBUSTION ENGINE HAVING DEDICATED EGR CYLINDER(S)

TECHNICAL FIELD OF THE INVENTION

This invention relates to internal combustion engines, and more particularly to an exhaust gas recirculation system that can be used to decrease catalyst light-off times.

BACKGROUND OF THE INVENTION

For many internal combustion engines, their engine control strategy has three important parameters: spark timing (or fuel injection timing in a diesel engine), the exhaust gas recirculation (EGR) rate and the air/fuel ratio (AFR).

To implement EGR, a fraction of the exhaust gas is recycled from the exhaust system back to the intake system. The recirculated exhaust gas is mixed with the fresh fuel-air mixture before entering the cylinders. EGR can be implemented in internal and external configurations. External configurations can be implemented as either a high pressure or low pressure loop, depending on whether the recirculated exhaust is introduced to the intake post compressor (high pressure loop) or pre-compressor (low pressure loop).

EGR has a long history of use in both diesel and spark-ignited engines for reduction of NOx emissions. It affects combustion in several ways. The combustion is cooled by the presence of exhaust gas, that is, the recirculated exhaust gas absorbs heat. The dilution of the oxygen present in the combustion chamber reduces the production of NOx. Also, if exhaust gas is being recirculated, less air is breathed by the engine, so reducing the amount of exhaust gas produced.

As a relatively simple and low cost technology, EGR can be expected to be widely used on all types of engines. Of particular interest is that EGR can reduce the need for fuel enrichment at high loads in turbocharged engines and thereby improve fuel economy.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to systems and methods for improved light-off of a catalytic exhaust aftertreatment device. The methods are for use with a turbocharged internal combustion engine having dedicated EGR. In a "dedicated EGR" engine, one or more of the engine's cylinders is used to generate exhaust gas to be recirculated to the intake charge of the entire engine.

The dedicated EGR may be produced by a cylinder having a single exhaust port that opens only to an EGR loop. The other cylinders produce "normal" exhaust, i.e., exhaust that exits the engine via one or more exhaust aftertreatment devices. U.S. Pat. No. 8,291,891, entitled "EGR System with Dedicated EGR Cylinders", to Alger, et al., describes a system that generates dedicated EGR in this manner and is incorporated by reference herein.

Alternatively, the dedicated EGR may be produced by a cylinder having dual exhaust ports. For production of dedicated EGR, during selected engine cycles, only one of these exhaust ports is open and that port is open to the EGR loop. During other engine cycles, the other exhaust port is open and the cylinder generates "normal" exhaust. U.S. patent application Ser. No. 13/736,271, entitled "EGR Rate Control for Internal Combustion Engine with Dual Exhaust-Ported Cylinders", to Gingrich, et al., discusses producing dedicated EGR in this manner and is incorporated by reference herein.

For purposes of this description, a "dedicated EGR cylinder" may be either type—a cylinder used only for the production of dedicated EGR or a cylinder used to produce dedicated EGR only when its EGR exhaust port is open. In either case, at a given time, the entire output of exhaust gas of the cylinder is recirculated as EGR. "Dedicated EGR" may be produced by either type of cylinder.

A feature of dedicated EGR is that the composition of the dedicated EGR exhaust gas may be controlled to be different from that of the exhaust of the non-dedicated cylinders. For example, the dedicated EGR cylinder(s) may be run rich to provide EGR that improves combustion on all cylinders.

Dedicated EGR with Single Exhaust-Ported Cylinders

Figure 1:
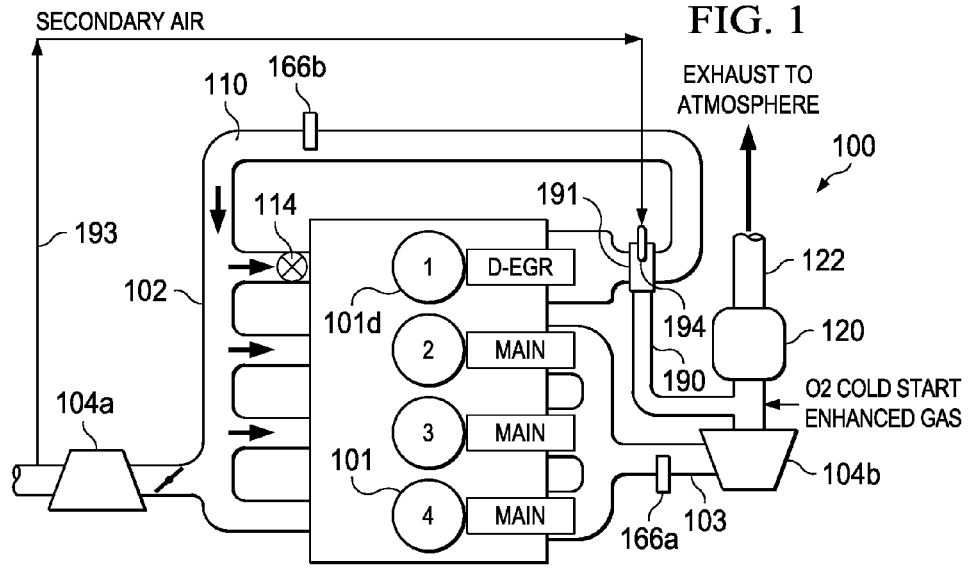
FIG. 1 illustrates an example of an internal combustion engine having a dedicated EGR cylinder and an EGR bypass line to an aftertreatment device.

FIG. 1 illustrates an internal combustion engine 100 having four cylinders 101. One of the cylinders is a dedicated EGR cylinder, and is identified as cylinder 101d. As explained below, engine 100 is also equipped with an EGR bypass line 190 and bypass valve 191 so that EGR gas can be directed to a catalytic exhaust aftertreatment device 120 to decrease the time required for catalyst light-off.

In the example of this description, engine 100 is spark ignited, with each cylinder 101 having an associated spark plug (not shown), and its "normal" air-fuel ratio is stoichiometric. However, the methods described herein are also suitable for use with compression ignited engines. In general, the engine's non-dedicated EGR cylinders 101 can be operated with whatever air-fuel ratio is appropriate for the engine.

The dedicated EGR cylinder 101d may be operated at any desired air-fuel ratio. All of its exhaust is recirculated back to the intake manifold 102. The exhaust of the other three cylinders 101 (referred to herein as the "main" or "non dedicated" cylinders) is directed to an exhaust system via an exhaust manifold 103.

Engine 100 is equipped with a turbocharger, specifically a compressor 104a and a turbine 104b. Although not explicitly shown, the cylinders have some sort of fuel delivery system for introducing fuel into the cylinders. This main fuel delivery system can be fumigated, port injected, or direct injected.

In the example of this description, the EGR line 110 joins the intake line downstream the compressor 104a. A throttle is used to control the amount of intake (fresh air and EGR) into the intake manifold 102.

An EGR valve 114 may be used to control the intake into the EGR cylinder 101d. In other embodiments, other means, such as variable valve timing, may be used to control EGR flow.

In other embodiments, there may be a different number of engine cylinders 101, and/or there may be more than one dedicated EGR cylinder 101d. In general, in a dedicated EGR engine configuration, the exhaust of a sub-group of cylinders is routed back to the intake of all the cylinders, thereby providing EGR for all cylinders.

After entering the cylinders 101, the fresh-air/EGR mixture is ignited and combusts. After combustion, exhaust gas from each cylinder 101 flows through its exhaust port and into exhaust manifold 103. From the exhaust manifold 103, exhaust gas then flows through turbine 104b, which drives compressor 104a.

After turbine 104b, exhaust gas flows to catalytic aftertreatment device 120, to be treated before exiting to the atmosphere. For purposes of this description, it is assumed that the aftertreatment device 120 is downstream the turbine 104b.

As stated above, the dedicated EGR cylinder 101d can operate at any equivalence ratio because its exhaust will not exit the engine before passing through a non-dedicated EGR cylinder 101 operating at a stoichiometric air-fuel ratio. Because only stoichiometric exhaust leaves the engine, the exhaust aftertreatment device 120 may be a three way catalyst. In embodiments in which the engine system is a lean burn system, the exhaust from the non dedicated ("main") EGR cylinders will pass through an appropriate exhaust aftertreatment device, such as a lean NOx trap, NOx adsorber or selective reduction catalyst.

To control the air-fuel ratio, exhaust gas may be sampled by an exhaust gas oxygen (EGO) sensor. Both the main exhaust line 122 and the EGR loop 110 may have a sensor (identified as 166a and 166b), particularly because the dedicated EGR cylinders may be operated at a different air-fuel ratio than non dedicated cylinders.

If a dedicated EGR cylinder is run rich of stoichiometric A/F ratio, a significant amount of hydrogen (H2) and carbon monoxide (CO) may be formed. In many engine control strategies, this enhanced EGR is used to increase EGR tolerance by increasing burn rates, increasing the dilution limits of the mixture and reducing quench distances. In addition, the engine may perform better at knock limited conditions, such as improving low speed peak torque results, due to increased EGR tolerance and the knock resistance provided by hydrogen (H2) and carbon monoxide (CO).

A control unit 150 has appropriate hardware (processing and memory devices) and programming for performing the methods described herein. In addition, control unit 150 may perform other tasks, such as overall EGR control, and may be integrated with a comprehensive engine control unit. The inputs, processes, and outputs relevant to this description are described below in connection with FIG. 3. The inputs include data representing whether the engine is in cold start condition, and may include feedback on temperature at the input to the aftertreatment device. The outputs include control signals for operating bypass valve 191 and secondary air valve 194, and may further include EGR control signals such as for control of air-fuel ratio to the dedicated EGR cylinder(s).

Dedicated EGR with Dual Exhaust-Ported Cylinders

Figure 2:
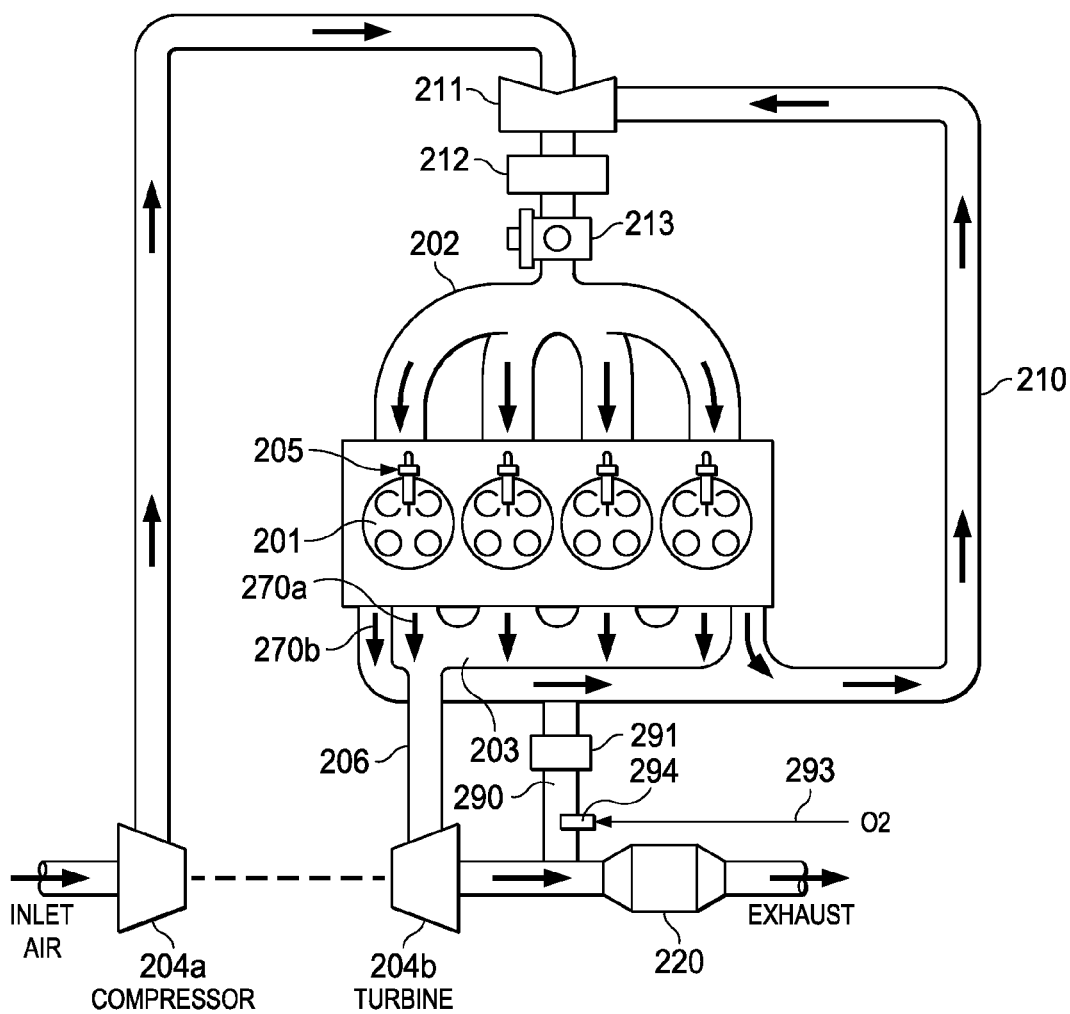
FIG. 2 illustrates an example of an internal combustion engine having dual exhaust-ported cylinders, which generate dedicated EGR as well as normal exhaust, and having an EGR bypass line.

FIG. 2 illustrates one embodiment of an internal combustion engine 200 having four cylinders 201, two of which have dual exhaust ports and dual exhaust valves. These dual exhaust-ported cylinders may be operated so that one of their exhaust valves is open to either the main exhaust line 206 or to the EGR loop 210 and the other exhaust valve is closed. The main exhaust line 206 and the EGR loop 210 are not in any fluid communication with each other, such that each cylinder has its two exhaust ports connected to entirely separate exhaust flow paths.

The cylinder exhaust port that opens to the main exhaust line 206 is referred to herein as the "main exhaust port" 270a and has a "main exhaust valve". The cylinder exhaust port that opens to the EGR loop 210 is referred to herein as the "EGR exhaust port" and has an "EGR exhaust valve". The exhaust valves associated with each exhaust port are not explicitly shown.

In the example of this description, engine 200 is normally stoichiometrically operated and is spark ignited, each cylinder 201 having an associated spark plug 205. However, the methods described herein are also suitable for use with compression ignited engines.

Each cylinder's dual exhaust valves are separately controlled on a cycle-by-cycle basis. Thus, at any engine cycle, one or the other exhaust valve is open. Further, at any engine cycle, all or some or none of the cylinders' EGR exhaust valves may be open to the EGR loop 210. If an EGR exhaust valve is not open to the EGR loop, its main exhaust valve is open to the main exhaust line. Thus, at any given cycle, a cylinder may be operating as a "dedicated EGR cylinder" or a "main exhaust cylinder".

When operating as a main exhaust cylinder, in some embodiments, a cylinder is run stoichiometrically. In other embodiments, a main exhaust cylinder may be run lean.

When operating as a dedicated EGR cylinder, a cylinder can operate at any equivalence ratio because its exhaust will not exit the engine before passing through a cylinder acting as a main exhaust cylinder. A dedicated EGR cylinder is typically run rich to provide EGR with a composition that is beneficial to engine operation, such as by improving combustion.

Although not explicitly shown, the cylinders have some sort of means for introducing fuel into the cylinders, such as fuel injectors. The main fuel delivery system can be fumigated, port injected, or direct injected.

Engine 200 is equipped with a turbocharger, specifically a compressor 204a and a turbine 204b. The main exhaust line 206 is equipped with one or more catalytic exhaust aftertreatment devices 220. The type of aftertreatment device is appropriate for the exhaust composition. Thus, where the main exhaust cylinders are run stoichiometrically, the aftertreatment device 220 can be a three way catalyst. Where the main exhaust cylinders are run lean, the aftertreatment device 220 could be a NOx trap or NOx adsorber.

In this embodiment, the EGR line 210 joins the intake line at a mixer 211. The mixture of recirculated exhaust and fresh air is cooled with a cooler 212. A throttle 213 is used to control the amount of intake into the intake manifold 202.

Like the embodiment of FIG. 1, engine 200 is equipped with an EGR bypass line 290 and bypass valve 291 so that EGR gas can be directed to the exhaust aftertreatment device 220 to decrease the time required for catalyst light-off. Also, like the embodiment of FIG. 1, engine 200 is equipped with a control unit 250, configured and programmed similarly to the control unit illustrated in FIG. 1.

EGR Bypass for Fast Light-Off

Referring again to FIG. 1, a bypass line 190 provides a direct line of fluid communication from the EGR loop 110 to a point between the turbine 104b and catalytic aftertreatment device 120. Ideally, to maximize heat of the exhaust gas in the bypass line 190, the bypass line 190 connects to the EGR loop 110 at a point near the exhaust manifold 103, and connects to the main exhaust line at a point directly upstream aftertreatment device 120.

A bypass valve 191 may be operated to allow some or all of the dedicated EGR in the EGR loop 110 to be directed into the bypass line 190 instead of through the EGR loop into the intake manifold. Bypass line 190 is configured to be as short as possible, and can be made from thermally insulated material to limit heat transfer from the exhaust gas before it reaches aftertreatment device 120. As explained below, the hot exhaust gas from the bypass line 190 is used to warm the aftertreatment device 120 during cold start conditions.

A secondary air line 193 provides air (and O2 contained therein) to the bypass line 190. A secondary air valve 194 may be operated to open, close or modulate the flow of air into the bypass line 190.

The engine 200 of FIG. 2 is similarly configured, also having an EGR bypass line 290, bypass valve 192, secondary air line 293, and secondary air valve 294. The following description is in terms of the engine of FIG. 1, but the same method may be used with the engine of FIG. 2.

Figure 3:
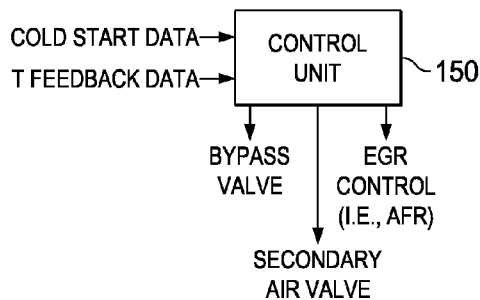
FIG. 3 illustrates a method of operating a turbocharged engine having dedicated EGR to decrease the light-off time for a catalytic exhaust aftertreatment device.

FIG. 3 illustrates a method of using dedicated EGR to decrease the light-off time required for a catalytic exhaust aftertreatment device. It is assumed that the engine is a turbocharged engine, where the need to avoid the heat sink of a turbine is critical. It is further assumed that the engine has one or more dedicated EGR cylinders.

The need for faster light-off is most evident during engine cold start. A faster light-off results in lower CO, HC and NOx emissions over the entirety of the engine cycle.

The method of FIG. 3 may be performed with appropriate programming of control unit 150. Control unit 150 receives the various inputs discussed below. It processes these inputs, and delivers appropriate control signals, such as to bypass valve 191, to whatever processes or actuators determine the air-fuel ratio of the dedicated EGR cylinder(s), and to secondary air (oxygen) input valve 194.

Step 30 is determining whether the engine is in cold start condition. This may be determined directly, such as by various sensing devices, or indirectly, such as by an ignition event. As a specific example, engine coolant temperature could be sensed and used to determine a cold start condition. Control unit 150 is programmed to receive input data representing a cold start condition, and to determine whether to initiate the cold start EGR mode described below.

In Step 31, if the engine is not in cold start condition, the dedicated EGR is directed to the EGR loop 110. Its composition is controlled by whatever EGR control strategy controls EGR during "normal" (non cold start) engine conditions.

In Step 32, if the engine is determined to be in cold start condition, the cold start EGR process begins. Valve 191 is activated to direct the dedicated EGR to bypass line 190. The amount of EGR that is diverted from the EGR loop may be all or only some. As indicated in FIG. 3, the cold start mode may run as feedback loop, so that as the engine warms, Step 32 may be revisited so that the amount of EGR into the bypass line 190 decreases.

In Step 33, the dedicated EGR is optimized for temperature rise. Generally, this means operating the dedicated EGR cylinder(s) at a rich air-fuel ratio so that the EGR has high concentrations of H2 (hydrogen) and CO (carbon monoxide).

The dedicated EGR composition desired for fast catalyst light-off is not necessarily the EGR composition desired during "normal" engine operating conditions. In the former case, a fast rise in temperature is desired; in the latter case, the EGR composition is typically optimized for good engine combustion. For example, although both EGR control strategies might operate the dedicated EGR cylinder rich, the air-fuel ratio may be different.

In Step 34, secondary air valve 194 is opened to provide O2 into the bypass line 190. The O2 can be in the form of ambient air or oxygen. It can be provided from the air intake system, before or after the intake air filter. In the embodiment of FIGS. 1 and 2, the O2 is provided in the form of ambient air, directed to the bypass line via a secondary air line from the engine intake as necessary. The level of O2 entering the catalyst from the dedicated EGR cylinder(s), from the main cylinders and as residual in the exhaust system at start-up will determine the amount of supplemental air introduced via the bypass line. The amount of O2 may be constant or modulated, and may be provided during all or some of cold start mode.

As a result of Steps 33 and 34, the H2 in the dedicated EGR oxidizes with O2 in the exhaust. This is particularly true for a platinum-based or other precious metal-based catalyst, which can promote H2 oxidation at temperatures as low as 100-150 degrees C.

The H2-enriched dedicated EGR is hot and not in contact with the large thermal sink of turbine 104b. It is expected that catalyst light-off times can be made to be in the 10 second range, as opposed to a 30 second range without EGR heating.

As indicated in Step 35, the cold mode process continues until the catalyst has achieved light-off. This may be sensed directly or indirectly, such as by measuring temperature at the inlet of the device or sensing the exhaust composition downstream the device. Until light-off is achieved, the cold mode process may involve modulating valves 191 and 194 or adjusting the EGR composition, such as by adjusting the air-fuel ratio.

In Step 36, once light-off occurs, valves 191 and 194 are closed. All of the dedicated EGR now flows through the EGR loop 110.

What is claimed is:

1. A method of using exhaust gas recirculation (EGR) to decrease the light-off time of a catalytic exhaust aftertreatment device, in an internal combustion engine having a number of cylinders, comprising:
   using one or more of the cylinders as a dedicated EGR cylinder, such that all of the exhaust produced by EGR cylinder(s), during all or some engine cycles, may be recirculated via an EGR loop when the engine is in normal (non cold start) operation;
   operating the dedicated EGR cylinder at a first air-fuel ratio that is different from that of the cylinders that are not dedicated;
   determining whether the engine is in cold start condition;
   if the engine is in cold start condition, entering a cold start mode that includes the following steps; using an EGR bypass line to divert all or some of the dedicated EGR from the EGR loop to the main exhaust line to a point between the turbine and the exhaust aftertreatment device; operating the dedicated EGR cylinder(s) at a second air-fuel ratio that is also different from that of the cylinders that are not dedicated; and providing supplemental oxygen to the EGR bypass line;
   determining whether light-off of the aftertreatment device has occurred; and
   if light-off has occurred, ending the cold start mode.

2. The method of claim 1, wherein the bypass line diverts EGR from the EGR loop at a point near the engine's exhaust manifold.

3. The method of claim 1, wherein the dedicated EGR cylinder(s) have a single exhaust port that may open to the EGR loop.

4. The method of claim 1, wherein the dedicated EGR cylinder(s) have dual exhaust ports, one of which may open to the EGR loop and the other of which may open to the engine's main exhaust line.

5. The method of claim 1, wherein the engine's non dedicated EGR cylinder(s) are run stoichiometrically.

6. The method of claim 1, wherein the engine's non dedicated EGR cylinders are run rich.

7. The method of claim 1, wherein the engine's non dedicated EGR cylinder(s) are run lean.

8. The method of claim 1, wherein the cold start mode further includes receiving data representing the catalyst temperature and adjusting one or more of the following: amount of dedicated EGR into the bypass line, amount of oxygen into the bypass line, the air-fuel ratio of the dedicated EGR cylinder(s).

9. An exhaust gas recirculation (EGR) system for improved engine operation and for decreasing the light-off time of a catalytic exhaust aftertreatment device, in an internal combustion engine having a number of cylinders, comprising:
one or more cylinders operable as a dedicated EGR cylinder, such that all of the exhaust produced by EGR cylinder(s), during all or some engine cycles, may be recirculated via an EGR loop when the engine is in normal (non cold start) operation;
an EGR loop for recirculating EGR from the dedicated EGR cylinder(s) to the engine's intake manifold;
an EGR bypass line that diverts EGR from the EGR loop to a point between the turbine and the exhaust aftertreatment device;
a control unit programmed to perform the following tasks: to determine whether the engine is in normal mode or in cold start condition, and if the engine is in normal mode, operating the dedicated EGR cylinder(s) at a first air-fuel ratio that is different from the air-fuel ratio of the non dedicated cylinders, if the engine is in cold start condition, to enter a cold start mode that includes the following steps: using the EGR bypass line to divert all or some of the dedicated EGR to a point upstream the exhaust aftertreatment device, operating the dedicated EGR cylinder(s) at a second air-fuel ratio that is different from the air-fuel ratio of the non-dedicated cylinders, and providing supplemental oxygen to the EGR bypass line;
the control unit further programmed to determine whether light-off of the aftertreatment device has occurred, and if light-off has occurred, to end the cold start mode.

10. The system of claim 9, further comprising a secondary air line to provide air from the engine intake to the bypass line.

11. The system of claim 9, wherein the bypass line diverts EGR from the EGR loop at a point near the engine's exhaust manifold.

12. The system of claim 9, wherein the dedicated EGR cylinder(s) have a single exhaust port that may open to the EGR loop.

13. The system of claim 9, wherein the dedicated EGR cylinder(s) have dual exhaust ports, one of which may open to the EGR loop and the other of which may open to the engine's main exhaust line.

14. The system of claim 9, wherein the engine's non dedicated EGR cylinder(s) are run stoichiometrically.

15. The system of claim 9, wherein the engine's non dedicated EGR cylinder(s) are run lean.

16. The system of claim 9, wherein the control unit is further programmed to perform, during the cold start mode, the tasks of receiving data representing the catalyst temperature and adjusting one or more of the following: the amount of dedicated EGR into the bypass line, the amount of oxygen into the bypass line, or the air-fuel ratio of the dedicated EGR cylinder(s).

17. The system of claim 9, wherein the engine is a spark ignited engine.

18. The system of claim 9, wherein the engine is a compression ignited engine.

* * * * *